(12) United States Patent
Mosanu et al.

(10) Patent No.: US 8,637,605 B1
(45) Date of Patent: Jan. 28, 2014

(54) UV RESISTANT, CLEAR, MOISTURE CURABLE SILANE FUNCTIONAL POLYOLEFIN-BASED COMPOSITIONS, ARTICLES INCLUDING THE SAME, AND METHODS OF USING THE SAME

(75) Inventors: Claudia Mosanu, Blaine, MN (US); Nathanael Hill, St. Paul, MN (US)

(73) Assignee: H.B. Fuller Company, St. Paul, MN (US)

( * ) Notice: Subject to any disclaimer, the term of this patent is extended or adjusted under 35 U.S.C. 154(b) by 436 days.

(21) Appl. No.: 12/907,384

(22) Filed: Oct. 19, 2010

(51) Int. Cl.
 *C08L 83/16* (2006.01)

(52) U.S. Cl.
 USPC .......................................... 525/101; 525/106

(58) Field of Classification Search
 USPC ................................. 525/101, 106
 See application file for complete search history.

(56) References Cited

U.S. PATENT DOCUMENTS

| | | | |
|---|---|---|---|
| 4,042,555 | A | 8/1977 | Raimondi |
| 5,266,392 | A | 11/1993 | Land |
| 5,856,404 | A | 1/1999 | Choung |
| 5,994,474 | A | 11/1999 | Wey |
| 6,286,288 | B1 | 9/2001 | France |
| 6,803,412 | B2 | 10/2004 | Nguyen-Misra |
| 7,442,739 | B1 | 10/2008 | Hatfield |
| 2004/0180154 | A1* | 9/2004 | Wang et al. ............... 428/34 |
| 2004/0216778 | A1* | 11/2004 | Ferri et al. ............... 136/251 |
| 2009/0042040 | A1 | 2/2009 | Paul |
| 2010/0143676 | A1* | 6/2010 | Hahn et al. ............... 428/212 |

OTHER PUBLICATIONS

ASTM Subcomittee D20.40 on Optical Properties, D 1003-00 Standard Test Method for Haze and Luminous Transmittance of Transparent Plastics, Annual Book of ASTM Standards, Jul. 2000, 208-213, West Conshohocken, PA, United States.
ASTM Subcomittee C24.30 on Adhesion, Standard Test C 749-01 Method for Adhesion-in-Peel of Elastomeric Joint Sealants, Annual Book of ASTM Standards, Jul. 2001, 119-122, West Conshohocken, PA, United States.
ASTM Subcomittee D20.70 on Analytical Methods, D 1505-03 Standard Test Method for Density of Plastics by the Density-Gradient Technique, Jan. 2004, 321-327, West Conshohocken, PA, United States.
ASTM Subcomittee D01.26 on Optical Properties, D 1544-04Standard Test Method for Color of Transparent Liquids (Gardner Color Scale), Jul. 2004, 201-202, West Conshohocken, PA, United States.
ASTM Subcomittee G03.03 on Simulated and Controlled Exposure Tests, G 155-00a Standard Practice for Operating Xenon Arc Light Apparatus for Exposure of Non-Metallic Materials, Annual Book of ASTM Standards, Nov. 2000, 655-661, West Conshohocken, PA, United States.

* cited by examiner

*Primary Examiner* — Margaret Moore
(74) *Attorney, Agent, or Firm* — Kirsten Stone; Allison Johnson

(57) ABSTRACT

A moisture curable composition that includes a silage functional polyolefin, a first thermoplastic polymer that includes a thermoplastic elastomer selected from the group consisting of block copolymer selected from the group consisting of styrene-ethylene-butylene-styrene block copolymer, styrene-ethylene-propylene-styrene block copolymer, and combinations thereof, the block copolymer including no greater than 30 mole % styrene, saturated ethylene alphaolefin copolymer, butyl rubber, and combinations thereof, and polybutene having a number average molecular weight less than 5000, the composition being clear and resistant to ultraviolet light.

33 Claims, No Drawings

UV RESISTANT, CLEAR, MOISTURE CURABLE SILANE FUNCTIONAL POLYOLEFIN-BASED COMPOSITIONS, ARTICLES INCLUDING THE SAME, AND METHODS OF USING THE SAME

BACKGROUND

The invention relates to preparing clear, ultraviolet light resistant compositions for sealing and gasketing applications.

Back bedding refers to placing a glass assembly (e.g., an insulating glass unit) in a frame. Back bedding sealants are used to seal and bond panes of glass to a substrate, e.g., a frame, and to bond insulating glass units to frames.

Glass that is commonly used in windows and doors is partially transparent to ultraviolet A light. About 90% of light of a wavelength greater than 350 nm passes through typical window glass, but about 90% of light of a wavelength less than 300 nm is blocked by the same glass.

A one-part moisture curable sealant is disclosed in U.S. 2004/0180154. All of the example compositions of the '154 application are prepared with ESCOREZ 1310 resin and grey pigment, and are not clear or water white.

SUMMARY

In one aspect, the invention features a moisture curable composition that includes 1) a silane functional polyolefin, 2) a first thermoplastic polymer that includes a thermoplastic elastomer selected from the group consisting of a) block copolymer selected from the group consisting of styrene-ethylene-butylene-styrene block copolymer, styrene-ethylene-propylene-styrene block copolymer, and combinations thereof, the block copolymer including no greater than 30 mole % styrene, b) saturated ethylene alphaolefin copolymer, c) butyl rubber, and d) combinations thereof, and 3) polybutene having a number average molecular weight less than 5000. The composition is transparent or translucent when cured and resistant to UV light.

In one embodiment, the composition further includes a second thermoplastic polymer that is different from the first thermoplastic polymer and is solid at room temperature and derived from alphaolefin monomers. In some embodiments, the second thermoplastic polymer includes at least one of butene-1 copolymer, butylene-propylene copolymer, and ethylene-octene copolymer.

In some embodiments, the polybutene has a molecular weight less than 3500.

In other embodiments, the polybutene is a homopolymer and the composition includes from about 10% by weight to about 35% by weight polybutene homopolymer based on the weight of the composition.

In another embodiment, the composition further includes from about 5% by weight to about 20% by weight of a second thermoplastic polymer different from the first thermoplastic polymer.

In other embodiments, the composition includes from about 5% by weight to about 50% by weight of the block copolymer.

In one embodiment, the polybutene is a homopolymer and the composition includes from about 5% by weight to about 20% by weight of the block copolymer, from about 5% by weight to about 20% by weight second thermoplastic polymer, and from about 10% by weight to about 35% by weight polybutene homopolymer.

In another embodiment, the composition, when in the form of a 0.01 inch (in) thick cured film, exhibits a transmittance of at least 75%. In one embodiment, when the composition is in the form of a 0.01 inch thick cured film, it has a Gardner color of no greater than 4 after 2000 hours of continuous exposure to ultraviolet light having a wavelength from 340 nanometer to 360 nanometer.

In other embodiments, the composition is in the form of a foam, e.g., a composition that has been foamed to at least 20%.

In some embodiments, the composition includes styrene-ethylene-butene-styrene block copolymer. In other embodiments, the block copolymer includes no greater than 20 mole % styrene.

In another embodiment, the composition further includes a catalyst.

In another aspect, the invention features a method of making a glass assembly, the method including contacting at least one of a first substrate and a second substrate with a composition disclosed herein, the first substrate including at least one of polymer, wood, metal, and glass, and the second substrate including glass, and contacting the other of the first substrate and the second substrate with the composition. In one embodiment, the first substrate includes at least one of aluminum, steel, and polyvinyl chloride. In another embodiment, the first substrate includes at least one of a window frame and an insulating glass unit including at least two panes of glass separated by a spacer. In other embodiments, the first substrate includes a pane of glass.

In some embodiments, the method further includes foaming the composition.

In one embodiment, the method is a back bedding method that includes applying a composition disclosed herein to at least one of a pane of glass and a frame, and contacting the composition with the other of the pane of glass and the frame.

In other aspects, the invention features a glass assembly that includes a first pane of glass, a substrate, and a composition disclosed herein in contact with the first pane of glass and the substrate. In one embodiment, the glass assembly includes a first pane of glass bonded to a second pane of glass through a composition disclosed herein.

In another aspect, the invention features a foam gasket that includes a moisture cured composition derived from a silane functional polyolefin, and a first thermoplastic polymer that includes a thermoplastic elastomer selected from the group consisting of 1) a block copolymer selected from the group consisting of styrene-ethylene-butylene-styrene block copolymer, styrene-ethylene-propylene-styrene block copolymer, and combinations thereof, the block copolymer including less than 30 mole % styrene, 2) saturated ethylene alphaolefin copolymer, butyl rubber, and 3) combinations thereof, the gasket being transparent or translucent. In one embodiment, the gasket composition further includes at least one of oil, polybutene homopolymer, and tackifying agent. In another embodiment, the gasket has a Gardner color of no greater than 4 after 2000 hours of constant exposure to ultraviolet light having a wavelength from 340 nanometer to 360 nanometer.

The composition is useful in applications in which a clear, UV resistant, heat resistant sealant is desired. The sealant composition is also useful as a gasket (e.g., a foamed gasket).

Other features and advantages will be apparent from the following description of the preferred embodiments and from the claims.

GLOSSARY

In reference to the invention, these terms have the meanings set forth below:

The term "clear" means transparent or translucent.

The term "resistant to ultraviolet light" means exhibiting a Gardner color of less than 5 after 1000 hours of continuous exposure to ultraviolet light having a wavelength from 340 nanometer (nm) to 360 nm emitted from a xenon lamp.

The phrase "water white" means a Gardener color of no greater than 2.

The term "compatible" refers to components, which, when combined, produce a composition that is initially clear (i.e., within 24 hours of manufacture).

The phrase "thermoplastic elastomer" refers to a thermoplastic polymer that does not deform permanently under a stress such as a stretching or compression, and recovers without the loss of properties such as strength after the stress is released.

The phrase "heat resistant" means does not flow at a temperature of 180° F. (82° C.).

DETAILED DESCRIPTION

Sealants used to back bed glass assemblies sometimes become visible to a user of the assembly. This can occur if the sealant "bleeds over" a substrate, e.g., a frame. Sealants that are exposed to ultraviolet (UV) light can discolor (e.g., turn yellow) over time. This is particularly undesirable when the sealant becomes visible to a user, e.g., through bleed over. A variety of compositions have been used as sealants including polyurethane-based sealants. Polyurethane sealants tend yellow or brown over time; thus any bleed over from polyurethane sealants must be removed or it will be visible to the user. Removing the bleed over is a labor intensive process and often requires the use of harsh solvents.

The moisture curable composition includes silane functional polyolefin and a first thermoplastic polymer that includes thermoplastic elastomer. Suitable thermoplastic elastomers include block copolymers, saturated ethylene alphaolefin copolymers, butyl rubber, and combinations thereof. The moisture curable composition can be formulated as a sealant composition by including, in addition to the silane functional polyolefin and the thermoplastic elastomer, polybutene, and hydrogenated tackifying resin in the composition, as well as other optional components. The moisture curable composition also can be formulated as a gasket composition by including, in addition to the silane functional polyolefin and the thermoplastic elastomer, additional optional components including e.g., polybutene, in the composition. The moisture curable composition preferably is essentially free of non-hydrogenated polymers, oligomers and monomers, where "essentially free of" means that to the extent that non-hydrogenated polymers, oligomers or monomers are present in the composition, they are present in an amount sufficiently small such that the composition remains resistant to ultraviolet light.

The composition is initially clear (i.e., transparent or translucent) when observed with the naked eye and exhibits very little or no discoloration after exposure to ultraviolet light. The clarity and UV resistance of the cured composition render it particularly well suited to applications and articles in which the cured composition remains visible to the user, is in contact with a glass substrate (e.g., back bedding applications and gasket applications), and combinations thereof.

One useful measure of clarity is transmittance. The cured composition, when in the form of a 0.01 inch thick film, preferably exhibits at least 75% transmittance, at least 76% transmittance, or even at least 79% transmittance when tested according to ASTM D 1003. When in the form of a 0.07 inch thick film, the cured composition preferably exhibits at least 40%, at least 42%, at least 45%, at least 60% or even at least 70% transmittance when tested according to ASTM D 1003. A transmittance of at least 75% is transparent. A transmittance of from at least 40% to less than 75% is translucent.

The composition preferably is water white in color. One useful measure of color is Gardner color. The composition preferably exhibits an initial Gardner color of no greater than 2, or even no greater than 1 when tested according to ASTM G 1544-04.

The cured composition also preferably exhibits resistance to degradation and discoloring when exposed to ultraviolet light. One measure of such UV resistance is the Gardner color exhibited by a sample of the composition after the sample has been exposed to 1000 hours of UV light having a wavelength from 340 nm to 360 nm emitted from a xenon lamp. After the cured composition has been exposed to 1000 hours, 2000 hours, or even 4000 hours of UV light from a xenon lamp, it preferably exhibits a Gardner color of less than 5, no greater than 4, or even no greater than 3 when tested according to ASTM G 1544-04.

The moisture curable composition exhibits a viscosity of from about 10,000 centipoise (cP) to about 100,000 cP, from about 20,000 cP to about 90,000 cP, or even from about 45,000 cP to about 70,000 cP at 135° C. A moisture curable composition useful for forming a gasket exhibits a viscosity of at least about 10,000 cP, at least about 40,000 cP, at least about 80,000 cP, or even from about 90,000 cP to about 150,000 cP at 177° C. A moisture curable composition suitable for foaming exhibits a viscosity of no greater than about 50,000 cp, no greater than about 40,000 cP, from about 10,000 cP to about 30,000 cP, or even from about 10,000 cP to about 20,000 cP at 177° C.

The composition cures when exposed to atmospheric moisture to a cured composition that exhibits a maximum tensile strength of at least 65 psi, at least 70 psi, at least 100 psi, or even at least 200 psi, at 23° C., and a maximum elongation of at least 400%, at least 475%, at least 550%, or even at least 800%.

The moisture curable composition can be applied in the form of a melt at temperatures above 110° C., or even from about 110° C. to about 150° C., exhibits a green strength (i.e., an initial lap shear at 15 minutes) of at least about 2 psi, at least 5 psi, at least 15 psi, at least 20 psi, or even at least 30 psi, and an open time (i.e., the period during which the melt remains a liquid) of from a few seconds to about five minutes.

The moisture curable composition, when formulated as a sealant composition, preferably exhibits a final lap shear strength (i.e., four weeks after the composition has cured) of at least 45 psi, at least 60 psi, at lest 70 psi, or even at least 90 psi when tested at 23° C. and 50% relative humidity. The cured composition preferably exhibits hardness of from about 20 to about 60 Shore A, from about 25 to about 55 Shore A, or even from about 30 to about 50 Shore A.

The moisture cured composition is heat resistant and preferably does not flow, melt or weep when exposed to a temperature of at least 100° C., or even at least 115° C.

The moisture curable composition includes silane functional polyolefin. Useful classes of silane functional polyolefins include, e.g., silane functional amorphous polyalphaolefins and silane functional metallocene catalyzed polyolefins.

Suitable silane functional amorphous polyalphaolefins have a degree of crystallinity of no greater than 25% as determined by X-ray diffraction. Useful silane functional amorphous polyalphaolefins are derived from amorphous polyalphaolefin and a silane source. Useful amorphous polyalphaolefins include homopolymers, copolymers and terpolymers of olefins including, e.g., atactic polypropylene, atactic poly-1-butene and combinations thereof. The amorphous polyalphaolefins can be random or block copolymers. Other suitable amorphous polyalphaolefin polymers include, e.g., homogeneous substantially linear ethylenealphaolefin interpolymers derived from monomers including, e.g., propylene, 1-butene, 1-pentene, 3-methyl-1-butene, 1-hexene, 3-methyl-1-pentene, 4-methyl-1-pentene, 3-ethyl-1-pentene, 1-octene, 1-decene, and 1-undecene; amorphous copolymers with other olefins (e.g., ethylene, 1-butene, -pentene, 1-hexene, 4-methyl-1-pentene, 1-octene, and 1-decene) containing propylene as a major component, amorphous copolymers with other olefins (e.g., ethylene, propylene, 1-pentene, 1-hexene, 4-methyl-1-pentene, 1-octene, and 1-decene) containing 1-butene as a major component; and combinations thereof. Preferred amorphous polyalphaolefin polymers include atactic polypropylene, propylene-ethylene amorphous copolymers, and propylene-1-butene amorphous copolymers. Useful silane functional amorphous polyalphaolefin polymers include, e.g., copolymers and terpolymers derived from alpha olefin monomers having from 4 to 10 carbon atoms in an amount from 0% by weight to 95% by weight (or even from 3% by weight to 95% by weight), propane in an amount from 5% by weight to 100% by weight (or even from 5% by weight to 97% by weight), and ethane in an amount from 0% by weight to 20% by weight as described, e.g., in U.S. Pat. No. 5,994,474, and incorporated herein.

Useful silane functional metallocene catalyzed polyolefins include, e.g., homopolymers of ethylene, homopolymers of olefin monomers having from 3 to 8 carbon atoms, and interpolymers that include at least two olefin monomers having from 2 to 8 carbon atoms.

Suitable silanes for grafting on to the polyolefin have two or three alkoxy groups attached directly to the silicon and at least one olefinic double bond containing moiety. Suitable examples include vinyltrimethoxysilane, vinyltriethoxysilane, vinyl tris(2-methoxyethoxy)silane, 3-methacryloxypropyltrimethoxysilane, 3-methacryloxypropyltriethoxysilane, vinyldimethylmethoxysilane and vinylmethyldibutoxysilane. A useful amount of silane for grafting on to the polyolefin is from about 0.1% by weight to about 10% by weight, from about 2% by weight to about 6% by weight, or even from about 3% by weight to about 5% by weight, based on the weight of the amorphous polyalphaolefin.

Any known method for grafting silane onto the polyolefin can be used including, e.g., solution and melt (e.g., using an appropriate amount of a free-radical donor) methods. Useful methods of preparing silylated amorphous polyalphaolefins are described, e.g., in U.S. Pat. No. 5,994,474 and DE 40 00 695, and incorporated herein. Suitable examples of free-radical donors include diacyl peroxides such as dilauryl peroxide and didecanoyl peroxide, alkyl peresters (e.g., tert-butyl peroxy-2-ethylhexanoate), perketals (e.g., 1,1-di(tert-butylperoxy)-3,3,5-trimethylcyclohexane and 1,1-di(tert-butylperoxy)cyclohexane), dialkyl peroxides (e.g., tert-butyl cumyl peroxide, di(tert-butyl) peroxide and dicumyl peroxide), C-radical donors including, e.g., 3,4-dimethyl-3,4-diphenylhexane and 2,3-dimethyl-2,3-diphenylbutane, and azo compounds (e.g., 2,2'-azodi(2-acetoxypropane)).

Useful silane functional amorphous polyalphaolefins are commercially available under the VESTOPLAST trade designation from Evonik Degussa GmbH, Germany including, e.g., VESTOPLAST 206V and VESTOPLAST 2412 silane functional amorphous polyalphaolefins.

Useful silane functional metallocene catalyzed polyolefins are commercially available under the trade designations LICOCENE PE SI 3361 TP and LICOCENE PP from Clariant AG (Muttenz, Switzerland).

The silane functional polyolefin is present in the composition in an amount of from about 5% by weight to about 80% by weight, from about 10% by weight to about 60% by weight, or even from about 15% by weight to about 55% by weight.

The first thermoplastic polymer is a thermoplastic elastomer. Useful thermoplastic elastomers include block copolymers, saturated ethylene alphaolefin copolymers, butyl rubber, and combinations thereof. Suitable block copolymers include, e.g., styrene-ethylene-butylene-styrene block copolymers, styrene-ethylene-propylene-styrene block copolymers, and combinations thereof. The block copolymers include no greater than 30 mole % styrene, no greater than 20 mole % styrene, or even no greater than 15 mole % styrene.

Useful commercially available elastomeric, thermoplastic block copolymers include saturated block copolymers including, e.g., styrene-ethylene-butylene-styrene block copolymers available under the KRATON G series of trade designations including, e.g., KRATON G-1657 and G-1652, from Kraton Polymers (Houston, Tex.) and styrene-ethylene-propylene-styrene block copolymers available under the SEPTON series of trade designations including, e.g., SEPTON 2004 and SEPTON 2005, from Kuraray America Inc. (Padena, Tex.).

The elastomeric, thermoplastic block copolymer is present in the composition in an amount of from 0% by weight to about 50% by weight, at least 5% by weight, from about 5% by weight to about 40% by weight, from about 5% by weight to about 20% by weight, or even from about 5% by weight to about 15% by weight. One useful composition includes less than 30% by weight of the block copolymer having no greater than 30% styrene. Another useful composition includes less than 40% by weight of the saturated block copolymer having no greater than 20% styrene.

Useful saturated ethylene alphaolefin elastomers include amorphous polyalphaolefin elastomers and metallocene catalyzed elastomers including, e.g., copolymers and terpolymers derived from aliphatic mono-1-olefin (alpha olefin) monomers having from 2 to 10 carbon atoms including, e.g., ethylene-hexene, ethylene-octene, ethylene-butene, propylene-ethylene, propylene-butene, propylene-octene copolymers, and combinations thereof. Useful commercially available saturated ethylene alphaolefin copolymers include, e.g., VISTAMAXX 6102 propylene-based elastomers, EXACT 5008 ethylene-butene copolymer, and EXACT 3031 ethylene-hexene copolymer, all of which are available from ExxonMobil Chemical Co. (Houston, Tex.), and ENGAGE (e.g., ENGAGE 8200) from Dow Chemical Co. (Midland, Mich.).

The composition includes from 0% by weight to about 40% by weight, from about 5% by weight to about 40% by weight, from about 5% by weight to about 30% by weight, or even from about 5% by weight to about 20% by weight saturated ethylene alphaolefin elastomer.

The butyl rubber can be present in the composition in an amount no greater than 10% by weight, or even no greater than 5% by weight.

Useful polybutenes have a number average molecular weight (Mn) less than 5000, less than 3500, less than 3000, or even from about 100 to about 2000. Useful polybutenes are tacky. Examples of suitable polybutenes include polybutene homopolymer, isobutylene/butene copolymers, and combinations thereof.

Useful commercially available polybutenes include, e.g., polybutenes available under the INDOPOL series of trade designations including, e.g., INDOPOL H100, H300, H1500, and H1900 from INEOS USA LLC (League City, Tex.).

The composition includes from 0% by weight to about 40% by weight, from about 5% by weight to about 35% by weight, from about 10% by weight to about 30% by weight, or even from about 15% by weight to about 30% by weight polybutene.

The composition optionally includes a hydrogenated hydrocarbon tackifying agent. Particularly useful hydrogenated hydrocarbon tackifying agents are substantially hydrogenated, at least 90% hydrogenated, or even fully hydrogenated, water white, non-polar, stable to ultraviolet light, and heat resistant. Useful hydrogenated tackifying agents have a ring and ball softening point of from about 50° C. to about 150° C., or even from about 80° C. to about 120° C. Examples of suitable hydrogenated tackifying agents include hydrogenated aliphatic, hydrogenated cycloaliphatic, and combinations thereof.

Suitable commercially available hydrogenated tackifying agents include, e.g., tackifying agents available under the EASTOTAC series of trade designations including, e.g., EASTOTAC H-130w, EASTOTAC H-142w, and REGALITE R 1100 from Eastman Chemical Co. (Kingsport, Tenn.), under the REGALREZ 1094 trade designation from Hercules, under the ARKON series of trade designations including, e.g., ARKON P-115 and ARKON P-90 from Arakawa Chemical Inc. (Chicago, Ill.), the ESCOREZ series of trade designations including, e.g., ESCOREZ 5380, from ExxonMobil Chemical Corp. (Houston, Tex.), and SUKOREZ SU 100 hydrogenated aliphatic tackifying agent from Kolon Industries, Inc. (Korea).

The hydrogenated tackifying agent is preferably present in the composition in an amount of from about 0% by weight to about 50% by weight, greater than 10% by weight, from about 15% by weight to about 40% by weight, or even from about 20% by weight to about 30% by weight.

The composition optionally includes a second thermoplastic polymer. The second thermoplastic polymer is solid at room temperature. Examples of suitable second thermoplastic polymers include homopolymers, copolymers, and terpolymers derived from alphaolefin monomers having from 2 to 10 carbon atoms including, e.g., butene-1 copolymers, butylene-propylene copolymers, ethylene-propylene copolymers, ethylene-butene copolymers, ethylene-octene copolymers, and combinations thereof.

Useful commercially available second thermoplastic polymers include, e.g., amorphous polyalphaolefins available under the REXTAC series of trade designations, including, e.g., REXTAC RT 2535, RT 2585, and RT 2730 from Rexene Products Co. (Dallas, Tex.), the EASTOFLEX series of trade designations, including, e.g., EASTOFLEX E1060, from Eastman Chemical Co. (Kingsport, Tennessee), and the VESTOPLAST series of trade designations including VESTOPLAST 703, 704, 708, 308, 408, 508, and 608 from Evonik Degussa GmbH (Germany), metallocene catalyzed polyolefins available under the AFFINITY GA series of trade designations, including AFFINITY GA 1950 polyolefin polymer from The Dow Chemical Company (Midland Mich.), and polyethylene polymers available under the EPOLENE C series of trade designations from Eastman Chemical Co.

The second thermoplastic polymer is present in the composition in an amount of from about 0% by weight to about 25% by weight, from about 2% by weight to about 15% by weight, or even from about 5% by weight to about 12% by weight.

The composition optionally include less than 10% by weight or even less than 5% by weight ethylene vinyl acetate copolymer, examples of which are commercially available under the ATEVA series of trade designations from AT Plastics (Brampton, Ontario, Canada) including ATEVA 4030MC and ATEVA 1850, the ELVAX series of trade designations from DuPont de Nemours (Wilmington, Del.) and the ULTRATHENE series of trade designations from Millennium Petrochemicals (Rolling Meadows, Ill.).

The composition optionally includes antioxidants including e.g., antioxidants available under the TINUVIN series of trade designations including, e.g., TINUVIN 770 and TINUVIN 328 and under the IRGANOX series of trade designations including e.g., IRGANOX 1010 all of which are available from CIBA Specialty Chemicals Corp. (Tarrytown, New York). The antioxidant can be present in the composition in an amount of from about 0% by weight to about 3% by weight, from about 0.1% by weight to about 2% by weight, or even from about 0.2% by weight to about 1% by weight.

A catalyst is optionally added to the composition to increase the rate of crosslinking. Useful catalysts include, e.g., organotin compounds including, e.g., dialkyl tin dicarboxylates (e.g., dibutyl tin dilaurate and dibutyl tin diacetate), tin carboxylates, stannous salts of carboxylic acids (e.g., stannous octoate and stannous acetate), tetrabutyl dioleatodistannoxane, colorless organic titantates (e.g., VERTEC TIPT and VERTEC IPTH from Johnson Matthey Catalysts, England), organosilicon titantates, alkyltitantates, and metal alkoxides (e.g., aluminum isopropoxide and zirconium isopropoxide), and combinations thereof. The catalyst can be added either in pure form or, for greater ease of metering, in the form of a master batch that includes the amorphous polyalphaolefin. The catalyst can be added to the composition before melting, in the form of a dry mix, after melting, and combinations thereof. The catalyst can be present in the composition in an amount of from about 0.001% by weight to 5% by weight, from 0.005% by weight to about 1% by weight, or even from about 0.01% by weight to about 0.5% by weight.

The composition optionally includes a silane-containing coupling agent, which is also referred to as a "silane adhesion promoter." One example of a suitable silane-containing coupling agent is 3-glycidyloxypropyl trialkoxysilane. The silane-containing coupling agent can be present in the composition in an amount of from about 0% by weight to about 5% by weight, from about 0.2% by weight to about 2% by weight, or even from about 0.4% by weight to about 1% by weight.

The composition can also include other additives including, e.g., plasticizers, fillers (e.g., nanoparticles), thermal stabilizers, optical brighteners, antistats, lubricants, antioxidants, catalysts, rheology modifiers, biocides, corrosion inhibitors, dehydrators, surfactants antiblocking agents, flame retardants, and combinations thereof. To maintain a water white composition, the other additives preferably are clear, stable to ultraviolet light, and stable to heat. The type and amount of other additives are preferably selected to minimize the presence of moisture that can prematurely initiate cure of the sealant, and, optionally, to enhance the clarity and UV stability of the composition.

Useful plasticizers include, e.g., mineral oil, paraffinic oils, low molecular weight polyisobutene, and combinations thereof. The polybutene can also function as a plasticizer in some formulations. Useful commercially available plasticizers include, e.g., ELEVAST C30 fully paraffinic hydrocarbon fluids available from EXXONMOBIL Chemical Company (Houston, Tex.). The composition includes less than 30% by weight, less than 20% by weight, or even less than 10% by weight plasticizer.

Suitable nanoparticles include, e.g., montmorillonite, and nanoclay platelets. The nanoclay particles optionally are dispersed in a carrier (e.g., a resin) before being introduced into the composition. Useful nonoclay platelets have a thickness of from about 1 nm to about 100 nm. The amount of optional nanoparticles in the composition is preferably sufficiently small to maintain a clear composition. The composition can include less than 7% by weight, less than 5% by weight, or even from about 2% by weight to 5% by weight nanoparticles.

Suitable fillers include, e.g., fumed silica, precipitated silica, and aluminum silicates, and nanopowders. The amount of filler included in the composition is preferably sufficiently small to maintain a clear composition. Preferably the composition includes less than 5% by weight, less than 3% by weight, from about 0.1% by weight to less than 3% by weight, from 0.1% by weight to about 2% by weight filler, or even is free of filler.

The sealant composition can be used to bond a variety of substrates to one another including, e.g., glass, metal, aluminum, stainless steel, fiberglass composites, vinyl, polyvinyl chloride, polymer (e.g., polypropylene), wood (e.g., pressed wood composites, which optionally include polymer), and combinations thereof. The composition is particularly useful for bonding glass to various substrates including, e.g., other glass substrates, polymer substrates (e.g., acrylic substrates), metallic substrates, wood substrates (e.g., wood composites), and combinations thereof. The composition can be used in a variety of constructions including, e.g., insulating glass units, sash frame assemblies, automotive and molding applications, windows, doors, walls, and constructions that require good adhesion to glass, metal, plastic and combinations thereof.

The composition can be used in a variety of applications including, e.g., back bedding, gasketing, perimeter sealing, as a moisture vapor barrier, laminating, and combinations thereof. In back bedding, the composition is used to bond an insulating glass assembly, e.g., insulating glass units and sash assemblies, to a frame. Back bedding is discussed in more detail in U.S. Pat. Nos. 6,286,288 and 5,856,404, which are incorporated herein.

The moisture curable composition can be applied using a wide variety of application techniques including, e.g., linear extruder, hand gun, other forms of extruder beads, and combinations thereof. The substrates are subsequently joined to one another within the open time of the applied composition, the duration of which depends on the composition of the applied mixture.

The moisture curable composition can also be formulated to be foamable. The composition can be foamed in a variety of ways including, e.g., in situ as it is being applied, prior to application, and combinations thereof. The moisture curable composition can be foamed to any suitable extent including, e.g., at least 5%, at least 10%, at least 20%, at least 30%, or even at least 50%. The foamed composition can provide a useful gasket function and can be used to form gaskets.

The invention will now be described by way of the following examples. All parts, ratios, percents and amounts stated in the Examples are by weight unless otherwise specified.

EXAMPLES

Test Procedures

Test procedures used in the examples include the following. All ratios and percentages are by weight unless otherwise indicated.

Maximum Tensile Strength and Percent (%) Elongation Test Method

The maximum tensile strength and % elongation of the composition is determined according to ASTM-D638-00 entitled, "Standard Test Method for Tensile Properties of Plastics."

A homogeneous film of the composition is pressed at 100° C. to a thickness of from 40 mil to 60 mil. The film is conditioned at 23° C. and 50% relative humidity for one to four weeks during which time the composition cures. Specimens are cut from the film and the maximum tensile strength and % elongation are measured according to ASTM D638-00.

Test specimens are tested after one week and after four weeks.

Color Determination Test Method

Samples are tested for the presence of color using the Gardner color scale (1-18) and ASTM D1544-04 entitled, "Standard Test Method for Color of Transparent Liquids (Gardner Color Scale)."

UV Light Resistance Test Method

Samples are tested for resistance to discoloration by exposing the samples to continuous ultraviolet light having a wavelength of 340 nanometers (nm) to 360 nm emitted from a xenon lamp for 1000 hours in accordance with ASTM G 155-00a entitled, "Standard Practice for Operating Xenon Arc Light Apparatus for Exposure of Non-Metallic Materials," and then testing the samples according to the Color Determination Test Method. During the exposure period, the samples are sprayed with 42° C. water for 18 minutes every two hours in accordance with ASTM G26-96 Method No. 1 and apparatus type BH). The environment is kept at 30% relative humidity and the back panel temperature is 63° C. (145.4° F.).

Clarity Determination Test Method

Sample clarity is determined by measuring the % transmittance according to ASTM D-1003-00 entitled, "Standard Test Method for Haze and Luminous Transmittance of Transparent Plastics," Procedure A, on a film having a thickness of 0.01 inch (in) (0.254 millimeter (mm)) and a film having a thickness of 0.07 in (1.778 mm), and recording the results for both. Visual observations of clarity are also recorded.

A percent transmittance of at least 75% is deemed transparent. A percent transmittance of less than 75% and greater than 40% is deemed translucent.

Lap Shear Strength Test Method

The lap shear strength is determined according to ASTM C-961-01 entitled, "Standard Test Method for Lap Shear Strength of Hot Applied Sealants," with the exception that the test specimen is prepared as follows. A 1 in×1 in film of sealant composition having a thickness of from 50 mil to 60 mil is placed on a 4 in×1 in piece of aluminum. A 1 in×3 in piece of glass is then placed on top of the film and pressed hard against the film using maximum hand pressure. The test specimen is then heated at 120° C. for 10 minutes.

Initial lap shear (i.e., green strength) is measured at 15 minutes after preparing the bond sample.

Final lap shear is measured 1 to 4 weeks after preparing the bond sample and after conditioning the sample at 23° C. (75° F.) and 50% relative humidity in a controlled environment.

Viscosity Test Method

Viscosity is measured using a Brookfield Thermosel Viscometer using an S-29 spindle at 1 rotation per minute at a sample temperature (e.g., from 250° F. (121° C.) to 275° F. (135° C.)) sufficiently high to provide a liquid composition.

Hardness Test Method

The hardness of the composition is measured using a Shore A durometer according to ASTM D-2240, which is incorporated herein.

Peel Adhesion Test Method

Peel adhesion is tested according to ASTM C 794-01 entitled, "Adhesion-in-Peel of Elastomeric Joint Sealants," 2001 using a glass substrate.

Method of Determining Density

The density of the composition in an unfoamed state is measured according to ASTM D 1505 entitled, "Density of Plastic by the Density-Gradient Technique," 2004.

Determination of % Foam

To calculate the percent foam, a volume V of unfoamed sample is placed in a graduated cylinder and weighed (Sw1). The sample is then foamed and the same volume V of sample is placed in a graduated cylinder and weighed (Sw2). The percent foam is calculated by subtracting the second weight (Sw2) from the first weight (Sw1), dividing the difference by the first weight (Sw1) and multiplying by 100.

Example 1

The composition of Example 1 is prepared by combining with mixing the following ingredients in the amounts set forth in Table 1 in percent: VESTOPLAST 206V silane functional polyalphaolefin, KRATON G 1657 styrene-ethylene-butylene-styrene block copolymer, REGARLEZ 1094 hydrocarbon tackifying agent (Eastman Chemical Co., Kingsport, Tenn.), INDOPOL H 1900 polybutene having a molecular weight of 2500 (INEOS USA LLC, League City, Tex.), REXTAC 2730 propylene-butene-1 copolymer (Rexene Products Co., Dallas, Tex.), IRGANOX 1010 antioxidant (CIBA Specialty Chemicals Corp., Tarrytown, New York) and dibutyltin dilaurate.

The composition of Example 1 is foamed to 35% and allowed to harden in the form of a gasket.

The unfoamed composition of Example 1 is expected to have a density of 7.6 pounds per gallon of composition. When the composition of Example 1 is foamed to 35%, it is expected to have a density of 4.94 pounds per gallon of composition.

Example 2

The composition of Example 2 is prepared by combining with mixing the following ingredients in the amounts set forth in Table 1 in percent: VESTOPLAST 206V silane functional polyalphaolefin, ENGAGE 8200 ethylene-octene copolymer (Dow Chemical Company, Midland, Mich.), REGARLEZ 1094 hydrocarbon tackifying agent, INDOPOL H 1900 polybutene having a molecular weight of 2500, AFFINITY GA 1950 polyolefin polymer (Dow Chemical Co.), IRGANOX 1010 antioxidant, and dibutyltin dilaurate.

Example 3

The composition of Example 3 is prepared by combining with mixing the following components in the amounts set forth in Table 1 in percent: VESTOPLAST 206V silane functional polyalphaolefin, VESTOPLAST 2412 silane functional polyalphaolefin, VISTAMAXX 6102 propylene-based elastomer, ELEVAST C30 plasticizer, INDOPOL H 1900 polybutene haying a molecular weight of 2500, IRGANOX 1010 antioxidant, and dibutyltin dilaurate.

The compositions of Examples 1-3, when tested according to the Viscosity, Color, Clarity, Lap Shear (initial and 4 weeks), Maximum Tensile Strength, Percent Elongation, Hardness, Peel Adhesion, and Heat Resistance test methods, are expected to exhibit the results set forth in Table 1 below.

TABLE 1

|  | Example 1 | Example 2 | Example 3 |
|---|---|---|---|
| Vestoplast 206V | 30 | 30 | 20 |
| Vestoplast 2412 | 0 | 0 | 30 |
| Kraton G 1657 | 10 | 0 | 0 |
| Engage 8200 | 0 | 13 | 0 |
| Vistamaxx 6102/30% Elevast C30 | 0 | 0 | 30 |
| Regarlez 1094 | 25 | 25 | 0 |
| Indopol H 1900 | 23.98 | 23.98 | 19.8 |
| Rextac 2730 | 10 | 0 | 0 |
| Affinity GA 1950 | 0 | 7 | 0 |
| Irganox 1010 | 0.30 | 0.30 | 0.30 |
| Dibutyltin Dilaurate | 0.02 | 0.02 | 0.02 |
| Viscosity @ 275° F. (135° C.) (cP) | 55,000 | 65,000 | NT |
| Viscosity @ 350° F. (177° C.) | NT | NT | 135,000 cP |
| Initial Color | 2 | 1 | 1 |
| Initial Clarity | Transparent | Transparent | Transparent |
| Color after 2000 hours | 4 | 3-4 | 3-4 |
| Clarity after 2000 hours | Translucent | Translucent | Translucent |
| Initial Lap Shear (psi) | Between 15-20 | Between 15-20 | NA |
| Lap Shear (psi) 4 weeks cure | 75 | 65 | 57 |
| Max Tensile Strength (psi) | 93 | 80 | 260 |
| Max Elongation (%) | 600 | 500 | 900 |
| Shore A 4 weeks | 35 | 40 | 45 |
| Peel adhesion Glass (pli) | 35 | 30 | NT |
| Heat Resistance after 4 weeks | No flow, melting, or weeping at 240° F. (115° C.) | No flow, melting, or weeping at 240° F. | No flow, melting, or weeping at 240° F. |

NT = Not Tested
NA = Not Applicable
Max = maximum

All patents and references referred to herein are incorporated herein in their entirety to the extent they do not conflict.

Other embodiments are within the claims.

What is claimed is:

1. A moisture curable composition comprising:
   a silane functional polyolefin;
   a first thermoplastic polymer comprising a thermoplastic elastomer selected from the group consisting of
      block copolymer selected from the group consisting of styrene-ethylene-butylene-styrene block copolymer, styrene-ethylene-propylene-styrene block copolymer, and combinations thereof, the block copolymer comprising no greater than 30 mole % styrene,
      saturated ethylene alphaolefin elastomer, and
      combinations thereof; and
   polybutene having a number average molecular weight less than 5000,
   the composition being transparent or translucent and resistant to ultraviolet light.

2. The composition of claim 1 further comprising a second thermoplastic polymer different from the first thermoplastic polymer and the silane functional polyolefin, the second thermoplastic polymer being a solid at room temperature and being derived from alphaolefin monomers.

3. The composition of claim 2, further comprising a hydrogenated tackifying agent.

4. The composition of claim 1, further comprising a hydrogenated tackifying agent.

5. The composition of claim 2, wherein the second thermoplastic polymer comprises at least one of butene-1 copolymer, butylene-propylene copolymer, and ethylene-octene copolymer.

6. The composition of claim 1, wherein the polybutene is a homopolymer and the composition comprises from about 10% by weight to about 35% by weight polybutene homopolymer.

7. The composition of claim 1 further comprising from about 5% by weight to about 20% by weight of a second thermoplastic polymer different from the first thermoplastic polymer and the silane functional polyolefin, the second thermoplastic polymer being solid at room temperature.

8. The composition of claim 2, wherein the polybutene is a homopolymer and the composition comprises
from about 5% by weight to about 20% by weight of the block copolymer,
from about 5% by weight to about 20% by weight of the second thermoplastic polymer, and
from about 10% by weight to about 35% by weight polybutene homopolymer.

9. The composition of claim 1, wherein the composition, when in the form of a 0.01 inch thick cured film, has a transmittance of at least 75%.

10. The composition of claim 1, wherein the composition, when in the form of a 0.01 inch thick cured film, has a Gardner color of no greater than 4 after 2000 hours of continuous exposure to ultraviolet light having a wavelength from 340 nanometer to 360 nanometer.

11. The composition of claim 1, wherein the composition is foamed.

12. The composition of claim 1, wherein the composition comprises styrene-ethylene-butene-styrene block copolymer.

13. The composition of claim 1, wherein the composition comprises a block copolymer and the block copolymer comprises no greater than 20 mole % styrene.

14. A method of making a glass assembly, the method comprising:
contacting at least one of a first substrate and a second substrate with the composition of claim 4, the first substrate comprising at least one of polymer, wood, metal, and glass, and the second substrate comprising glass; and
contacting the other of the first substrate and the second substrate with the composition.

15. The method of claim 14, wherein the first substrate comprises at least one of a window frame and an insulating glass unit comprising at least two panes of glass separated by a spacer.

16. The method of claim 15 further comprising foaming the composition.

17. A back bedding method comprising:
applying the composition of claim 4 to at least one of a pane of glass and a frame; and
contacting the composition with the other of the pane of glass and the frame.

18. A glass assembly comprising:
a first pane of glass;
a substrate; and
the composition of claim 1 in contact with the first pane of glass and the substrate.

19. A foam gasket comprising:
a moisture cured composition derived from the composition of claim 1,
the gasket being transparent or translucent.

20. The gasket of claim 19 having a Gardner color of no greater than 4 after 2000 hours of constant exposure to ultraviolet light having a wavelength from 340 nanometer to 360 nanometer.

21. A foam gasket comprising:
a moisture cured composition derived from the composition of claim 1, the gasket being at least one of transparent and translucent.

22. The gasket of claim 21 having a Gardner color of no greater than 4 after 2000 hours of constant exposure to ultraviolet light having a wavelength from 340 nanometer to 360 nanometer.

23. A moisture vapor barrier comprising the composition of claim 1.

24. A sealant comprising the composition of claim 1.

25. A moisture vapor barrier comprising:
a cured composition derived from the composition of claim 1.

26. A sealant comprising:
a cured composition derived from the composition of claim 1.

27. A moisture curable composition comprising:
a silane functional polyolefin;
a first thermoplastic polymer comprising a thermoplastic elastomer selected from the group consisting of
block copolymer selected from the group consisting of styrene-ethylene-butylene-styrene block copolymer, styrene-ethylene-propylene-styrene block copolymer, and combinations thereof, the block copolymer comprising no greater than 30 mole % styrene,
saturated ethylene alphaolefin elastomer, and
combinations thereof;
from about 5% by weight to about 20% by weight of the block copolymer;
from about 10% by weight to about 35% by weight polybutene homopolymer having a number average molecular weight less than 5000; and
from about 5% by weight to about 20% by weight of a second thermoplastic polymer that is different from the first thermoplastic polymer, the second thermoplastic polymer being a solid at room temperature and being derived from alphaolefin monomers,
the composition being transparent or translucent and resistant to ultraviolet light.

28. A foamed moisture curable composition comprising:
a silane functional polyolefin;
a first thermoplastic polymer comprising a thermoplastic elastomer selected from the group consisting of
block copolymer selected from the group consisting of styrene-ethylene-butylene-styrene block copolymer, styrene-ethylene-propylene-styrene block copolymer, and combinations thereof, the block copolymer comprising no greater than 30 mole % styrene,
saturated ethylene alphaolefin elastomer, and
combinations thereof; and
polybutene having a number average molecular weight less than 5000,
the composition being transparent or translucent, resistant to ultraviolet light and in the form of a foam.

29. The composition of claim 27, wherein the block copolymer comprises styrene-ethylene-butene-styrene block copolymer.

30. The composition of claim 27 further comprising a hydrogenated tackifying agent.

31. The composition of claim 27, wherein the second thermoplastic polymer comprises at least one of butene-1 copolymer, butylene-propylene copolymer, and ethylene-octene copolymer.

32. The composition of claim 27, wherein the composition, when in the form of a 0.01 inch thick cured film, has a transmittance of at least 75%.

33. The composition of claim 27, wherein the composition, when in the form of a 0.01 inch thick cured film, has a Gardner color of no greater than 4 after 2000 hours of continuous exposure to ultraviolet light having a wavelength from 340 nanometer to 360 nanometer.

* * * * *

UNITED STATES PATENT AND TRADEMARK OFFICE
CERTIFICATE OF CORRECTION

PATENT NO. : 8,637,605 B1  
APPLICATION NO. : 12/907384  
DATED : January 28, 2014  
INVENTOR(S) : Claudia Mosanu and Nathanael Hill Page 1 of 1

It is certified that error appears in the above-identified patent and that said Letters Patent is hereby corrected as shown below:

In the Specification:

Col. 11, line 63, replace "haying" with --having--

In the Claims:

Col. 13, line 7, cancel the text beginning with "5. The composition of claim 2," to and ending "copolymer." in column 13, line 10, and insert the following claim:
--5. The composition of claim 2, wherein the second thermoplastic polymer comprises butene-1 copolymer, butylene-propylene copolymer, ethylene-octene copolymer, or a combination thereof.--

Col. 13, line 52, cancel the text beginning with "15. The method of claim 14," to and ending "a spacer." in column 13, line 55, and insert the following claim:
--15. The method of claim 14, wherein the first substrate comprises of a window frame, an insulating glass unit, or a combination thereof, comprising at least two panes of glass separated by a spacer.--

Col. 14, line 9, cancel the text beginning with "21. A foam gasket comprising:" to and ending "and translucent." in column 14, line 12, and insert the following claim:
--21. A foam gasket comprising: a moisture cured composition derived from the composition of claim 1, the gasket being transparent or translucent.--

Col. 15, line 3, cancel the text beginning with "31. The composition of claim 27," to and ending "copolymer." in column 15, line 6, and insert the following claim:
--31. The composition of claim 27, wherein the second thermoplastic polymer comprises butene-1 copolymer, butylene-propylene copolymer, ethylene-octene copolymer, or a combination thereof.--

Signed and Sealed this  
Twenty-ninth Day of April, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,637,605 B1  Page 1 of 1
APPLICATION NO. : 12/907384
DATED : January 28, 2014
INVENTOR(S) : Mosanu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 465 days.

Signed and Sealed this
Twelfth Day of May, 2015

Michelle K. Lee
*Director of the United States Patent and Trademark Office*